United States Patent Office 2,728,747
Patented Dec. 27, 1955

2,728,747

POLYESTER RESINS

David Aelony and Malcolm M. Renfrew, Minneapolis, Minn., assignors to General Mills, Inc., a corporation of Delaware No Drawing. Application October 22, 1952,
Serial No. 316,320

2 Claims. (Cl. 260—78.3)

The present invention relates to polyester resins having unusual properties. The polyester resins are derived by the self-condensation of p-hydroxybenzoic acid. The resins are linear, high polymers and in the most useful range have intrinsic viscosities of greater than 0.5 as determined in high boiling phenols. The unusual properties of high softening temperature and low solubility apparently are due to the piling up of a high concentration of aromatic nuclei in a chain polymer, and the products obtained may be used in a wide variety of ways, including the formation of fibers, solvent-resistant gaskets, chemically resistant woven filters, and molded heat-resistant electrical insulators.

It is, therefore, an object of the present invention to provide novel polyester resins derived from the self-condensation of p-hydroxybenzoic acid.

It is a further object of the invention to provide a novel process of producing such polyester resins.

The process involves the simple heating of p-hydroxybenzoic acid or p-acetoxy benzoic acid in the presence of a condensing agent. For this purpose triphenyl phosphite has been found to be highly suitable. The reaction is conducted in a suitable vessel equipped with a water trap to eliminate the water reaction. Preferably, the process is carried out in the presence of a solvent at approximately reflux temperature. Toward the end of the reaction, it may be desirable to distill off or otherwise remove the solvent and to finish the reaction in a vacuum. This serves not only to carry the reaction to a greater extent but also serves to remove any residual monomer and low molecular weight condensation products. The products obtained are high melting (150–350° C. depending upon the size of the polymer) and are, for all practical purposes, insoluble in normal organic solvents. Their high softening temperature and insolubility make them excellent for the uses listed above.

Example 1

307 g. of p-hydroxybenzoic acid, 5 g. of triphenyl phosphite and 50 cc. of xylene were agitated and refluxed under a Stark and Dean tube. During the first two hours of reactions, 28 cc. of water were collected (theoretical water, 40 cc.) The reaction was continued for an additional 5 hours, but no further water distilled over. A vacuum was then applied to remove the solvent and residual monomer. The residue in the reaction vessel was partly liquid and partly solid. The liquid part of the resin was removed and allowed to solidify to a hard tan product having a melting point of 160–7° C., an acid number of 86.7 and a hydroxyl number of 47.3. On the basis of the hydroxyl number, the product was a decamer.

The solid resin remaining in the reaction vessel was extracted with boiling dimethyl formamide, and the solution was filtered hot. The filtrate was allowed to cool which resulted in a precipitate of a colloidal nature. Water was added which resulted in further precipitation. The precipitate was filtered off and dried, yielding a solid melting at 330–5° C. and having an acid number of 7.7, hydroxyl number of 36, carbon content 69.49%, hydrogen content 3.69%. The low acid number may be due to partial decarboxylation, but also would properly be expected in a polymer of high molecular weight. On the basis of the hydroxyl number, the product was a tridecamer, but low solubility of this product tends to complicate this analytical procedure. The theoretical percent of carbon in an infinite polymer having the recurring group —$OC_6H_4CO$— is 70%. The theoretical percent of hydrogen for such an infinite polymer is 3.33%.

Example 2

180 g. p-acetoxy benzoic acid and 150 cc. tetrahydronaphthalene were heated to reflux in a 500 cc. three-neck flask provided with a one foot column, a stirrer and thermometer. The solution darkened rapidly. A solution of .5 g. of p-toluene sulfonic acid in 5 cc. methanol was then added. Acetic acid began to distill off. After sixty minutes, 60 cc. of distillate had been obtained. This was equivalent to 91.7% of the theoretical quantity. Some of the polyester precipitated out and was separated. The precipitate was then washed with methanol. The residue was then extracted with boiling dimethyl formamide. The residue from this extraction was washed with methanol and dried. The methanol insoluble-dimethyl formamide soluble material weighed 6 g. and had a capillary melting point of 289–94° C. The dimethyl formamide soluble portion weighed 50 g. and had a melting point of 270–290° C.

Numerous other polymers may be made by varying the extent to which the condensation is conducted or by effecting further fractionation of the reaction mixture. In general, desirable products are found to be high softening and with low solubility.

The products may be composed of the simple self-condensation product of p-hydroxybenzoic acid or the product may be modified, for example, by the inclusion of dibasic acids and dihydroxy phenols such as terephthalic acid and bisphenol A in the reaction mixture to form condensation copolymers. Other modifying agents may likewise be used.

We claim as our invention:

1. Process of producing a polyester resin which comprises heating p-hydroxybenzoic acid in the presence of triphenyl phosphite until the reaction product has a softening temperature in the range of 150–350° C.

2. Process of producing a polyester resin which comprises condensing p-hydroxybenzoic acid in the presence of triphenyl phosphite and xylene until the reaction product has a softening temperature in the range of 150–350° C.

References Cited in the file of this patent

UNITED STATES PATENTS

| | | |
|---|---|---|
| 2,350,326 | Du Vall | June 6, 1944 |
| 2,585,427 | Beck | Feb. 12, 1952 |
| 2,600,376 | Caldwell | June 17, 1952 |

FOREIGN PATENTS

| | | |
|---|---|---|
| 382,301 | Great Britain | Oct. 24, 1932 |
| 533,095 | Great Britain | Feb. 6, 1941 |